United States Patent
Koller et al.

(10) Patent No.: US 6,453,870 B1
(45) Date of Patent: Sep. 24, 2002

(54) ELECTRICALLY CONDUCTING FILTER

(76) Inventors: David Richard Koller, 204 E. Hendry St., Saline, MI (US) 48176; De Quan Yu, 3093 N. Foxridge Ct., Ann Arbor, MI (US) 48105; Eric Roll, 42667 Preswick Ct., Belleville, MI (US) 48111; Ling Bai, 325 Giles Blvd. West #802, Windsor, Ontario (CA), N9A 6H7

( * ) Notice: Subject to any disclaimer, the term of this patent is extended or adjusted under 35 U.S.C. 154(b) by 0 days.

(21) Appl. No.: 09/751,482

(22) Filed: Dec. 28, 2000

(51) Int. Cl.[7] .......................... F02B 77/04; B01D 35/06
(52) U.S. Cl. .................... 123/198 E; 123/509; 210/243
(58) Field of Search ............................ 123/198 E, 509; 210/243

(56) References Cited

U.S. PATENT DOCUMENTS

| | | | | |
|---|---|---|---|---|
| 5,382,359 A | * | 1/1995 | Brandt | 210/243 |
| 5,785,032 A | * | 7/1998 | Yamashita et al. | 123/509 |
| 5,798,048 A | * | 8/1998 | Ries | 210/767 |
| 5,875,816 A | * | 3/1999 | Frank et al. | 137/549 |
| 6,156,201 A | * | 12/2000 | Ueda et al. | 210/416.4 |
| 6,168,713 B1 | * | 1/2001 | Sekine et al. | 210/172 |
| 6,171,492 B1 | * | 1/2001 | Hedgepeth et al. | 210/243 |
| 6,260,543 B1 | * | 7/2001 | Chih | 123/509 |
| 6,328,063 B1 | * | 12/2001 | Tistchenko | 137/565.22 |

* cited by examiner

*Primary Examiner*—Tony M. Argenbright
*Assistant Examiner*—Hai Huynh

(57) ABSTRACT

An electrically conducting fuel filter mechanism for a fuel supply system for an internal combustion engine. The housing for the fuel filter has a conductive inner or core layer and at least one non-conductive outer layer positioned adjacent the fuel. The conductive layer is made from a non-conductive material with conductive fibers or powders mixed in it, while the non-conductive layer is free from the conductive materials. Any electrostatic or electrical charge buildup in the fuel filter, fuel or housing, will be dissipated through the inner non-conductive layer forming conductive paths directly to the conductive layer. This prevents any further charge buildup and pitting.

11 Claims, 2 Drawing Sheets

ELECTRICALLY CONDUCTING FILTER

TECHNICAL FIELD

The present invention relates to fuel filters for vehicles, particularly electrically conducting fuel filters.

BACKGROUND

Fuel filters are in common use in vehicles as part of the fuel supply system for delivering fuel to internal combustion engines. The size, placement, and type of fuel filter varies widely from engine to engine and manufacturer to manufacturer. For example, the fuel filter can be positioned in the engine compartment either on or adjacent to the engine, in the fuel tank itself, either in a fuel module or the like, or in a fuel line between the fuel tank and the engine. Fuel filters positioned in modules adapted to be positioned in a fuel tank are shown, for example, in U.S. Pat. Nos. 5,392,750 and 5,782,223.

Non-metallic fuel filters are in common use due to their low cost and ease of manufacture. These fuel filters typically have a non-metallic housing and a conventional paper-type fuel filter. Often, however, an electrical charge buildup on the walls or other surfaces of the non-metallic fuel filter causes pitting of the material which can lead to fuel leakage. In an effort to solve this problem, metallic fibers and/or powders have been added to the non-metallic material to make the walls or surfaces conductive. One of the systems is shown, for example, in U.S. Pat. No. 5,076,920. The addition of metallic materials to the non-conductive material, however, can cause difficulties in molding the products, and material fibers have a tendency to make the surface of the walls rough, causing higher flow resistance.

There is thus a need for an improved fuel filter which prevents the buildup of electrical charges and subsequent leaking and does not have resultant molding or fuel flow difficulties.

SUMMARY OF THE INVENTION

It is an object of the present invention to provide an improved fuel filter mechanism. It is also an object of the present invention to provide an improved fuel filter mechanism for a fuel supply system for an internal combustion engine.

It is another object of the present invention to provide an improved fuel filter mechanism which prevents or dissipates electrical charge buildup which could cause leakage of the fuel filter mechanism.

It is still another object of the present invention to provide an electrically conducting fuel filter mechanism which is easier to mold and does not have increased fuel flow resistance.

These and other objects, purposes and advantages of the present system will become apparent from the following summary and detailed description of the invention, when taken in view of the attached drawings and appended claims.

In accordance with the present invention, an improved fuel filter mechanism is provided which uses conductive material as the core material of the housing and has a non-conductive material as an outer layer (especially the layer adjacent the fuel). The non-conductive material can be on one or both sides of the core layer. The non-conductive material is preferably a plastic material, and the conductive material is preferably a metallic filler, such as metallic fibers or a metallic powder.

The fuel filter housing can be molded in two steps or layers, or the molding process can be set up to provide non-conductive layers on the outer surface or surfaces of the conductive material.

Electrical pitting is a primary cause of the failure of known fuel filter mechanisms. The buildup of static charges from the movement of fuel along the wall surfaces causes small holes to be formed in the walls (i.e., pitting). With the present invention, any electrical charge accumulated pitting process does not cause failure of, or leakage in, the fuel filter mechanism. If the non-conductive layer becomes pitted, electrical discharge paths to the conductive layer will be formed, thus eliminating any accumulation of harmful electrical charges.

With the present invention, the conductive material also does not have fibers which can cause difficulties with the molding process or protrude into the flow path to cause disturbances in the fuel flow path. This results in a product which has lower cost, does not increase fuel flow resistance or turbulence, and can be manufactured more easily.

DESCRIPTION OF THE PREFERRED EMBODIMENT(S)

The preferred use of the present invention relates to its use in a fuel supply system for an internal combustion engine for a vehicle or the like. It is understood, however, that the present invention can be utilized in any mechanism, engine, apparatus, or system where a fuel supply system is used.

It is also understood that the present invention can be used for fuel filter mechanisms of numerous sizes and shapes, and for fuel filter mechanisms positioned in various positions in a vehicle, such as in the engine compartment, in the fuel tank, or in a fuel line between the engine and fuel tank. The precise sizes and shapes of the fuel filter and housing are also not significant.

Figure 1:
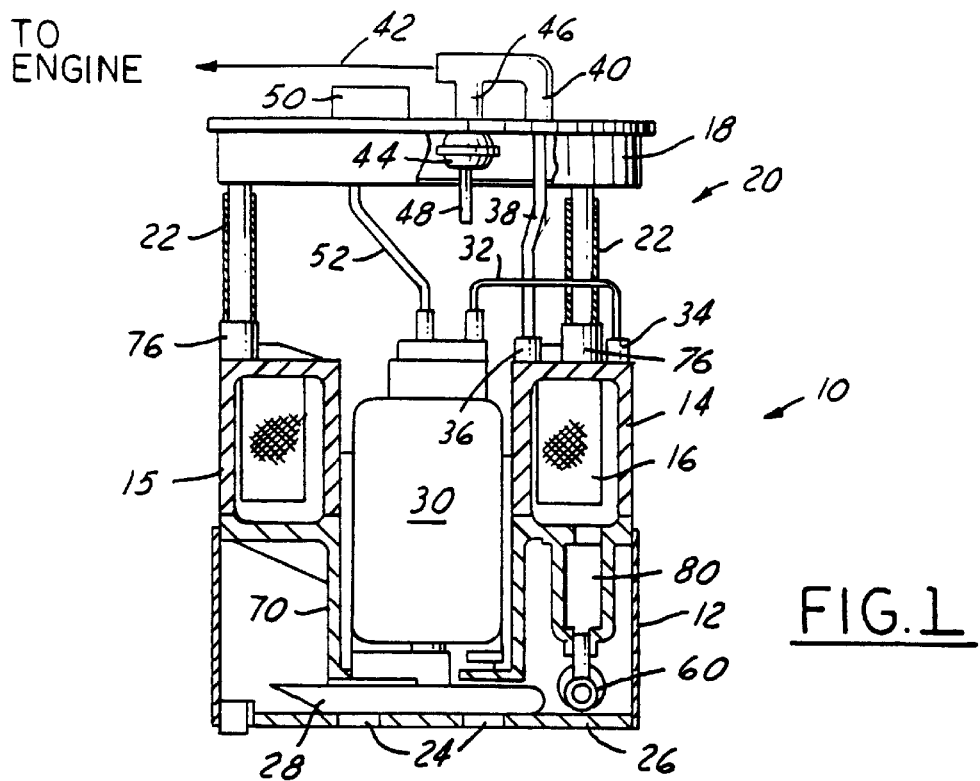
FIG. 1 illustrates a fuel module for a fuel system which incorporates the present invention.

A preferred embodiment of a fuel filter and housing is shown in FIG. 1 and indicated by the reference numeral 10. In this embodiment 10, the fuel filter mechanism is part of a fuel module 20 which is adapted to be positioned in a fuel tank (not shown) of a vehicle. In general, the fuel filter mechanism consists of a housing with a fuel filter inside, the housing having ports or openings for entry and exit of the fuel.

In general, the present invention relates to a relatively conventional fuel filter made from a paper material or the like which is positioned in a housing or enclosure and used to filter impurities from liquid fuel which is passed through it. The present invention provides an improved fuel filter/housing in which the basically non-metallic housing contains electrically conductive material and eliminates the problems associated with electrical charge buildup, pitting, and potential leakage of fuel found in many known fuel filter mechanisms and fuel supply systems today.

In the embodiment shown in FIG. 1, the fuel filter/housing mechanism 10 is included as part of a fuel module 20 which is positioned in a fuel tank (not shown) of a vehicle. The module 20 includes a reservoir or container 12 which is adapted to be positioned on the bottom of the fuel tank, an annular hollow housing 14 for the fuel filter 16, a cover member 18 which is adapted to be secured to the top of the fuel tank, and a pair of supporting rod or post members 22 which are positioned between the fuel filter housing 14 and the cover member 18. Preferably, the rods or post members 22 are biased by a coil spring or the like so that the bottom 26 of the reservoir 12 maintains in contact with the bottom of the fuel tank regardless of the expansion or contraction thereof.

In use, the fuel module 20 draws fuel from the fuel tank through openings 24 in the bottom 26 of the reservoir or container 12, initially filters the fuel through a sock filter 28, and passes the fuel through fuel pump 30 which sends the fuel through conduit 32 into inlet port 34 in the fuel filter housing 14. The fuel is then filtered through the fuel filter 16 contained in the housing 14 and sent through outlet port 36 and through conduits 38, 40, and 42 to the engine. A pressure regulator 44 is positioned in the return line 46 which returns unused fuel through conduit 48 to the reservoir and/or fuel tank. A jet pump 60 is positioned in the fuel module and is used to assist in introducing fuel through openings 24 into the reservoir 12 and maintaining an adequate fuel supply in the reservoir 12 for the fuel pump. Power for the fuel pump 30 is provided through electrical connector 50 which is attached to the cover 18 and which is connected by electrical connectors or wires 52 to the fuel pump 30.

Figure 2:
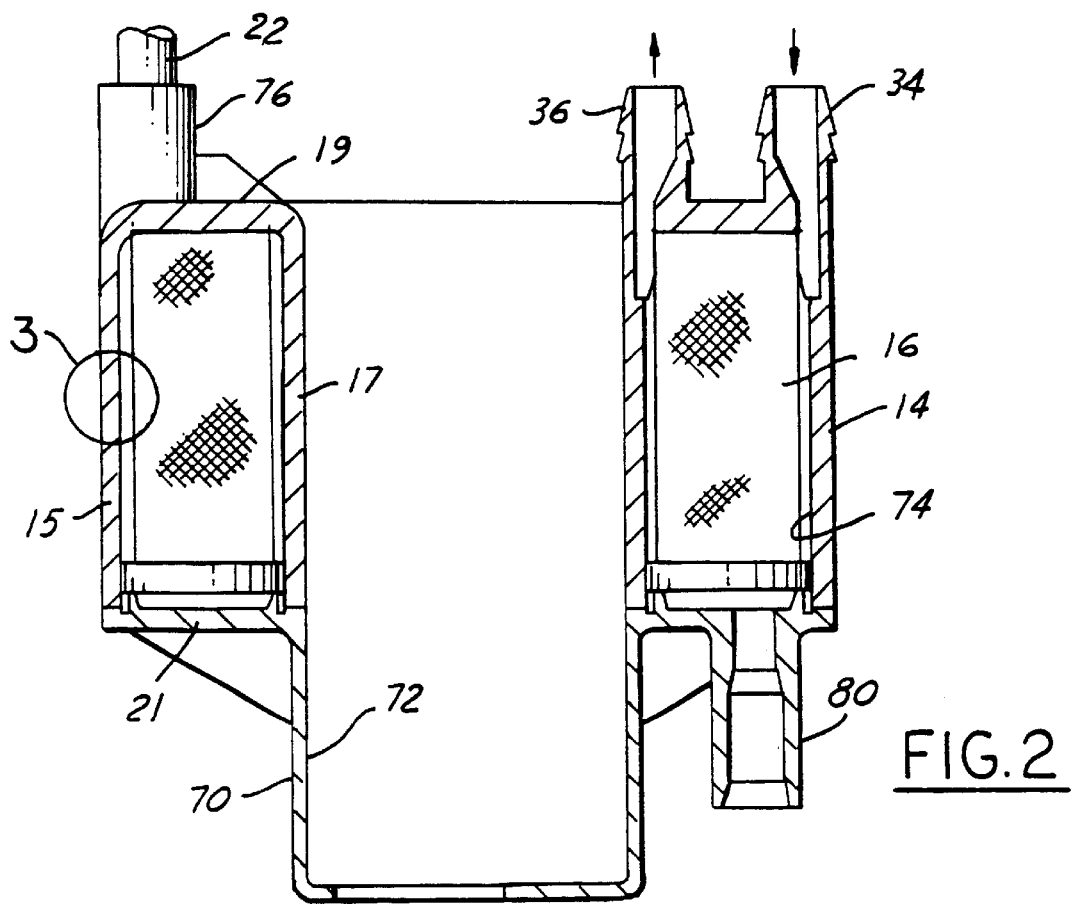
FIG. 2 illustrates the fuel filter housing of the fuel module shown in FIG. 1.

An enlarged view of the support member 70 for the fuel pump and fuel filter is shown in FIG. 2. The molded support member 70 includes a central cavity 72 in which the fuel pump 30 is positioned, an enclosed annular cavity 74 in which the fuel filter 16 is positioned, an inlet port 34 for passage of fuel to the fuel filter, an exit port 36 for exhaust of fuel from the fuel filter, and a pair of socket members 76 (only one of which is shown in FIG. 2) which are used to hold the rods or post members 22. In the embodiment shown, the molded support frame member 70 also includes port 80 which directs a portion of the fuel in the fuel chamber 74 toward and through the jet pump 60.

Figure 3:
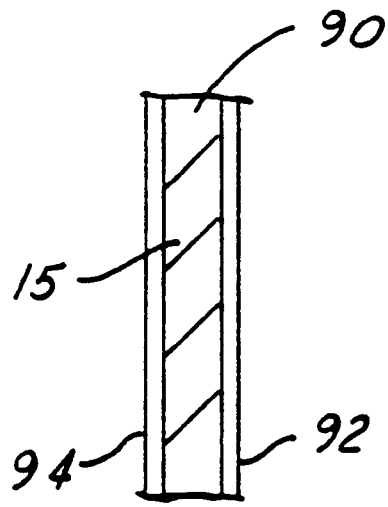
FIG. 3 is a partial cross-section of a portion of the fuel filter shown in FIG. 2.

In accordance with the present invention, the wall members of the fuel filter housing 14 are multi-layered structures. For example, as shown in FIG. 3, the wall member 15 is made of a conductive core member 90 positioned between two outer non-conductive layers 92 and 94. In an alternate embodiment, the wall member 15' can have the same core member 90 and only one non-conductive outer layer 92. In this regard, if only one non-conductive layer is provided, that layer should be positioned adjacent the flow of fuel in the housing.

The multi-layered construction for the fuel filter housing 14 is provided on all of the wall members forming the housing. These include the circular or annular outer wall member 15 as described above, as well as inner annular wall member 17, top wall member 19, and lower wall member 21. As indicated, the fuel filter housing member 14 is annular in shape and surrounds chamber 72. The fuel filter 16 also can be provided as a single annular or ring shaped member, or a plurality of individual pieces or members positioned to form an annular ring configuration in the housing 14.

The non-conductive material forming the outer layer or layers 92, 94 can be any plastic material, such as nylon or acetel.

The conductive core material 90 is preferably comprised primarily of the same material utilized in the non-conductive layers, but with the addition of a conductive filler added to it. The filler can be metallic or carbon fibers and/or metallic powders or the like. The fibers can be made of stainless steel, carbon block, metal flakes or the like, while the powders can be made of any metallic or conductive material.

The multi-layer structure forming the walls 15, 17, 19, and 21 can be molded in layers with the conductive core material being molded first and the non-conductive material being molded in layers on the inner and outer surfaces thereof. Alternatively, the molding temperature and viscosity of the conductive molding material, that is the non-conductive material with the metallic fibers or powders in it, can be adjusted in the molding process to create a multi-layered resulting product. Under certain molding conditions, the non-conductive material without the metallic fibers or powders, will migrate or flow toward the surfaces of the mold, forming a non-conductive layer 92, without any fibers or powder in it, thereby leaving all of the metallic fibers and powder in the center or core of the member forming the conductive core layer 90.

Figure 5A:
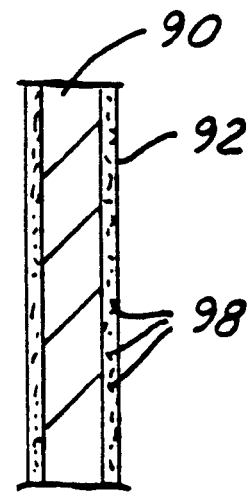
FIGS. 5A and 5B illustrate the embodiments shown in FIGS. 3 and 4 after they have been used.
Figure 4:
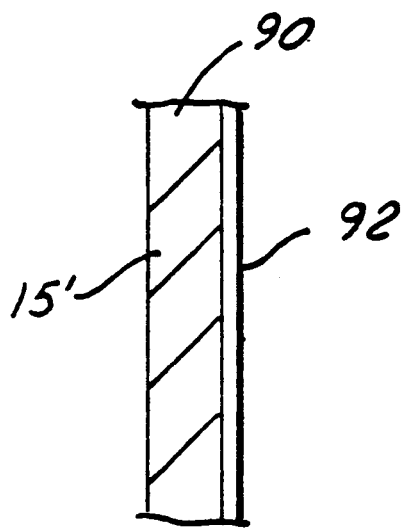
FIG. 4 illustrates an alternate embodiment of the invention.
Figure 5B:
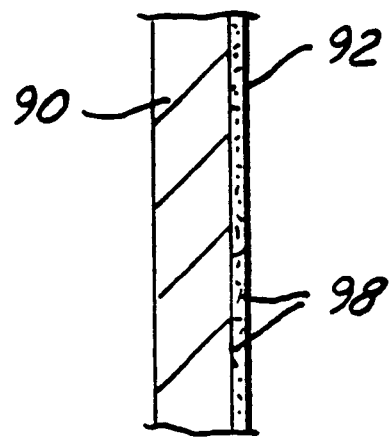

With the present invention, any electrical charge which may be accumulated by passage or flow of fuel through the fuel filter 16 and fuel filter housing 14 will not have any deleterious effect. Initially, the inner non-conductive layer 92 will become pitted, with small openings 98, as shown in FIGS. 5A and 5B. The initial pitting process forms electrical discharge paths from the fuel into the conductive core member 90, thereby eliminating the accumulation of electrical charge in the fuel filter 16 or fuel filter housing 14. The multi-layer material thus becomes conductive relative to the fuel and eliminates any electrical charge buildup.

With the present invention, any metallic or carbon fibers included in the conductive layer 90 will not penetrate into the cavity 74 of the fuel filter housing 14 and thus will not disturb the fuel flow or cause a higher flow resistance. With the present invention, a fuel filter housing can also be produced at a lower cost and with an easier manufacturing process than other electrically conducting fuel filter mechanisms.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A fuel filter mechanism comprising a housing member and a fuel filter member, said housing member having an internal chamber, an inlet port, an outlet port and a plurality of wall members forming the housing and surrounding the chamber, said fuel filter member being positioned in said chamber in said housing, each of said wall members having a layer of material facing said fuel filter member composed of an entirely electrically non-conductive material, and the remainder of said wall member being made of the same material as the non-conductive layer and having electrically conductive material in it.

2. The fuel filter member of claim 1 wherein said electrically non-conductive material is Nylon.

3. The fuel filter member of claim 1 wherein said electrically conductive material comprises metallic fibers.

4. The fuel filter member of claim 3 wherein said metallic fibers comprise stainless steel fibers.

5. The fuel filter member of claim 1 wherein said electrically conductive material comprises metallic powder.

6. The fuel filter member of claim 1 wherein said wall member has a second layer of the same electrically non-conductive material on the side opposite said fuel filter.

7. The fuel filter member of claim 1 wherein said housing member and fuel filter members are annular in shape.

8. A fuel module for a fuel system, said fuel module comprising a support frame member, a fuel pump member positioned in said support frame member, a fuel reservoir member connected to said support frame member, a cover member connected to said support frame member by a plurality of post members, a fuel filter housing member formed as part of said support frame member, and a fuel filter member positioned in said housing member, said housing member having wall members comprised of a unitary plastic material, the plastic material having electrically conductive fibers, flakes, or powder positioned at least in an inner core portion thereof forming an inner electrically conductive core portion, and having at least one outer layer without said electrically conductive fibers, flakes, or powder thereby providing at least one electrically non-conductive outer layer on the wall members.

9. The fuel module for a fuel system of claim 8 wherein said plastic material is Nylon.

10. The fuel module for a fuel system of claim 8 wherein said wall members have two outer layers of electrically non-conductive material.

11. The fuel module for a fuel system of claim 8 wherein said housing member and fuel filter members are annular in shape.

\* \* \* \* \*